Aug. 12, 1969
J. T. WILLIAMS
3,461,274
ELECTRIC FOOD TOASTER
Original Filed Oct. 22, 1965
6 Sheets-Sheet 1
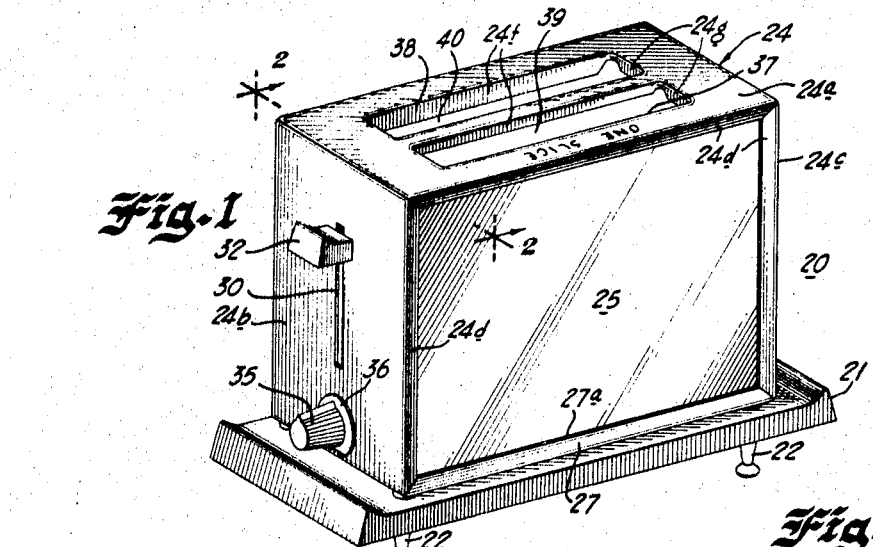
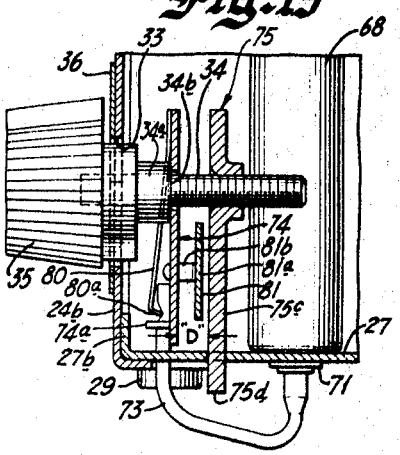
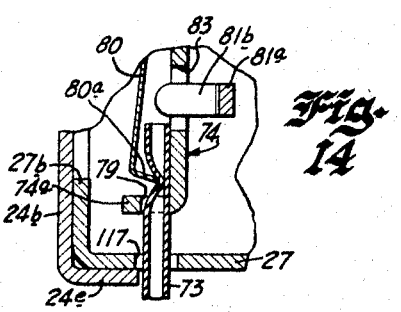
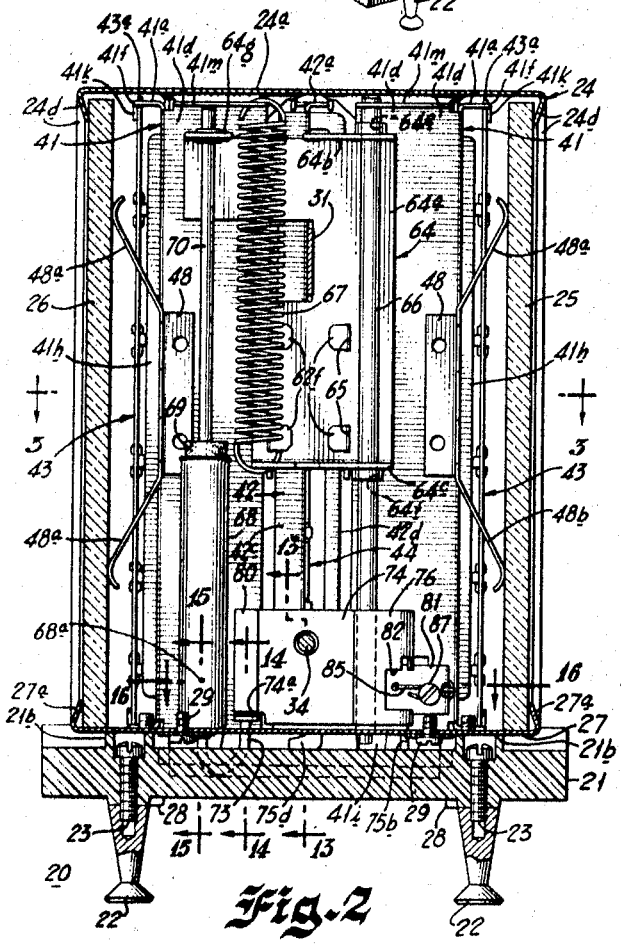
INVENTOR
JAMES T. WILLIAMS

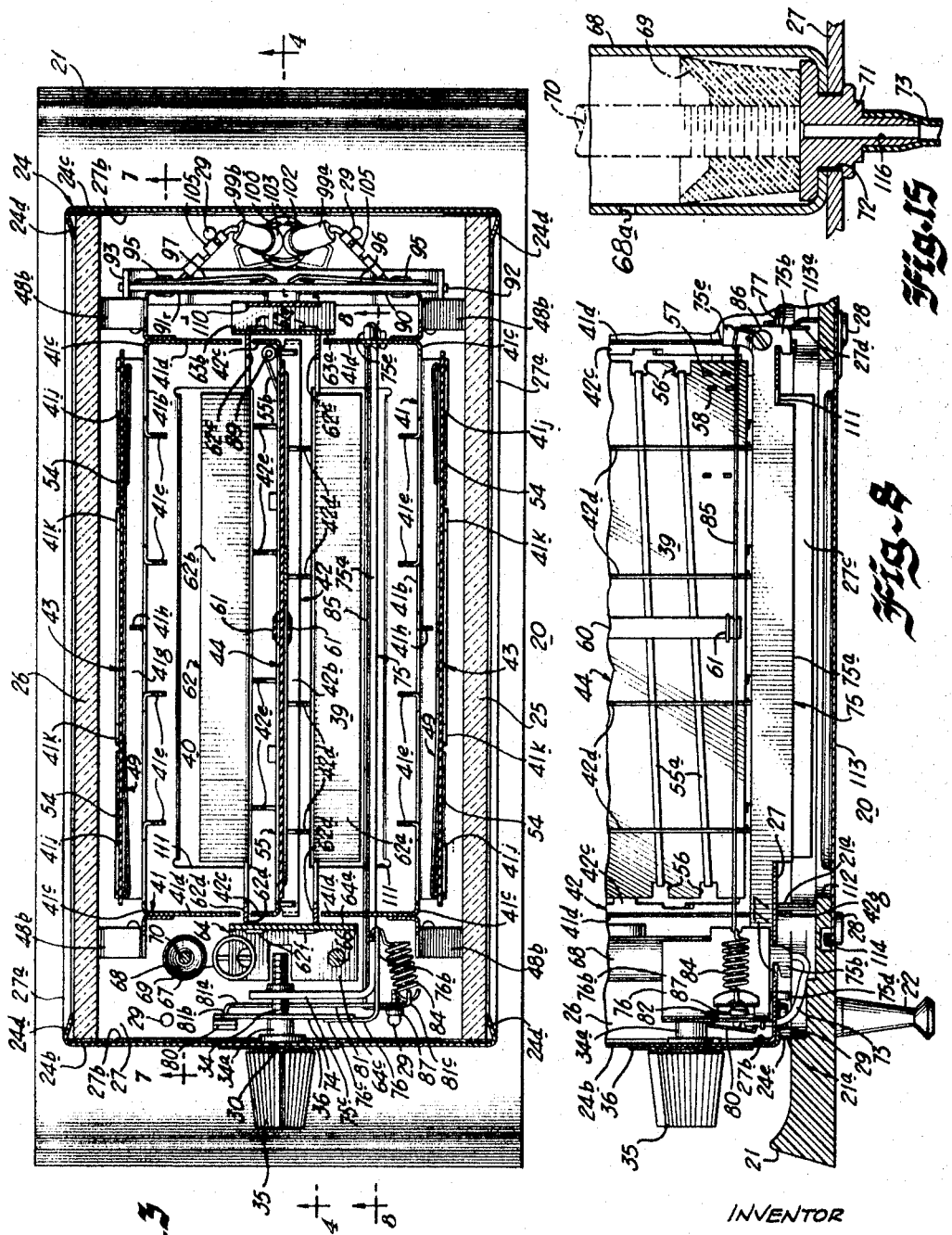
Inventor
James T. Williams

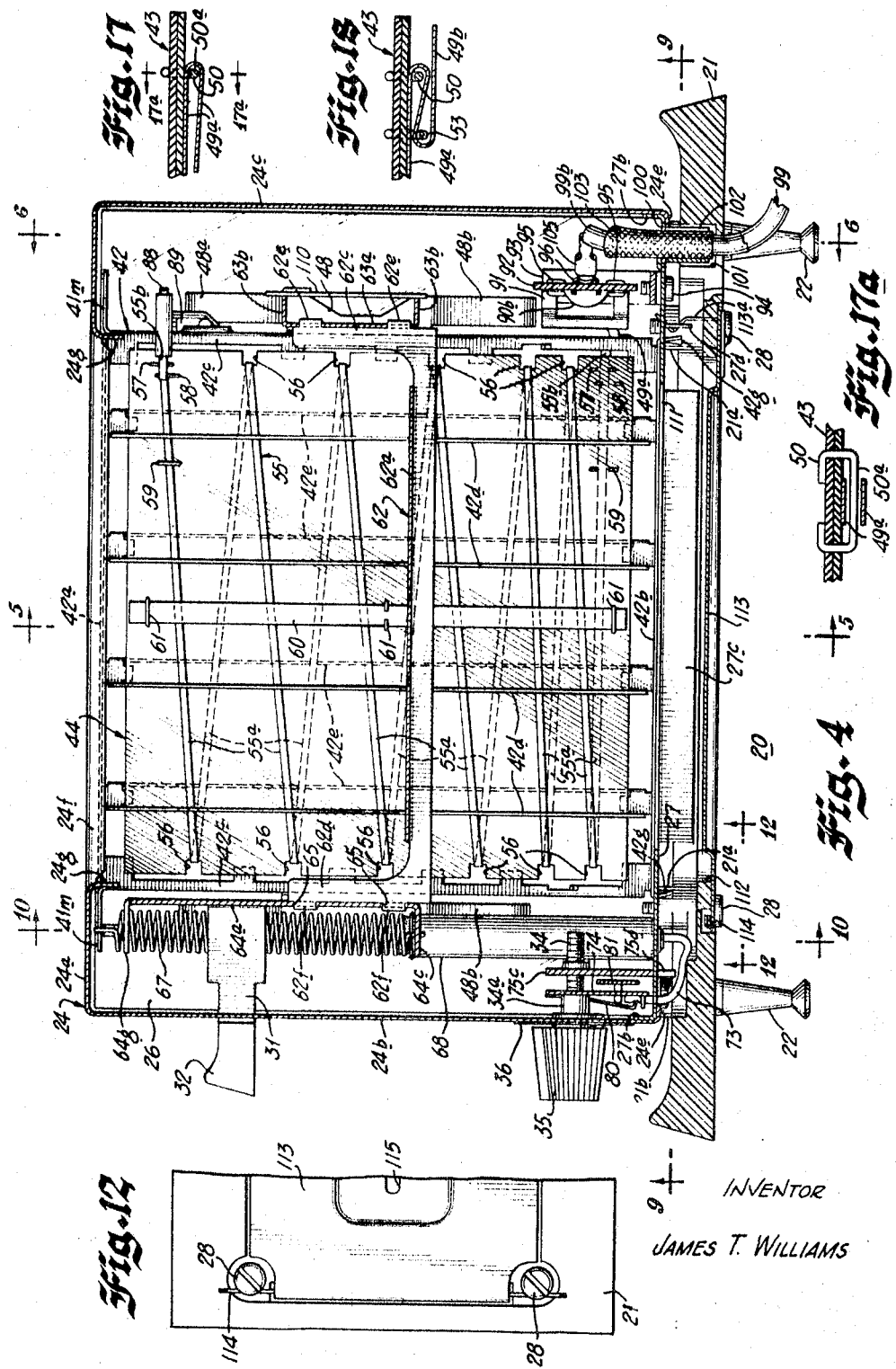

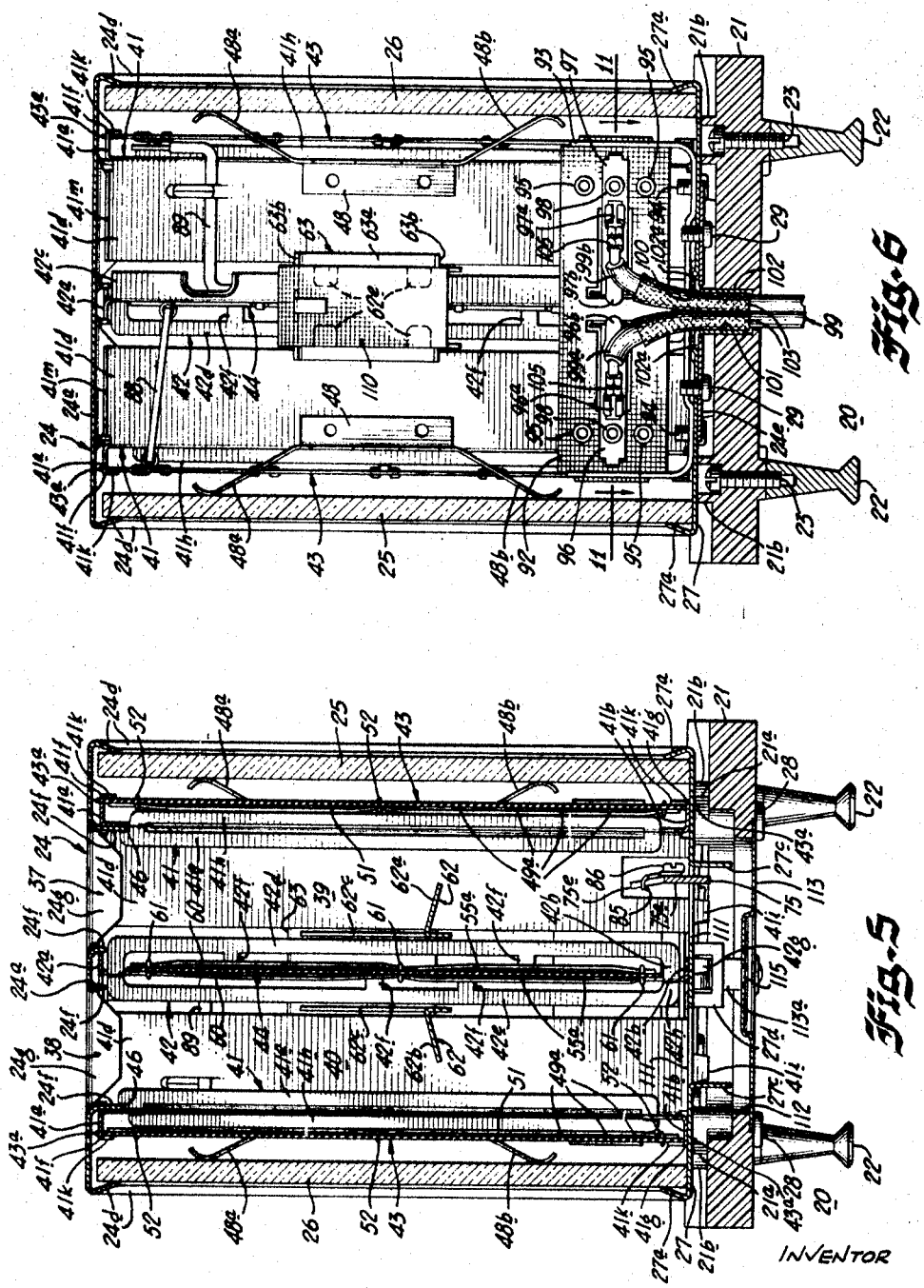

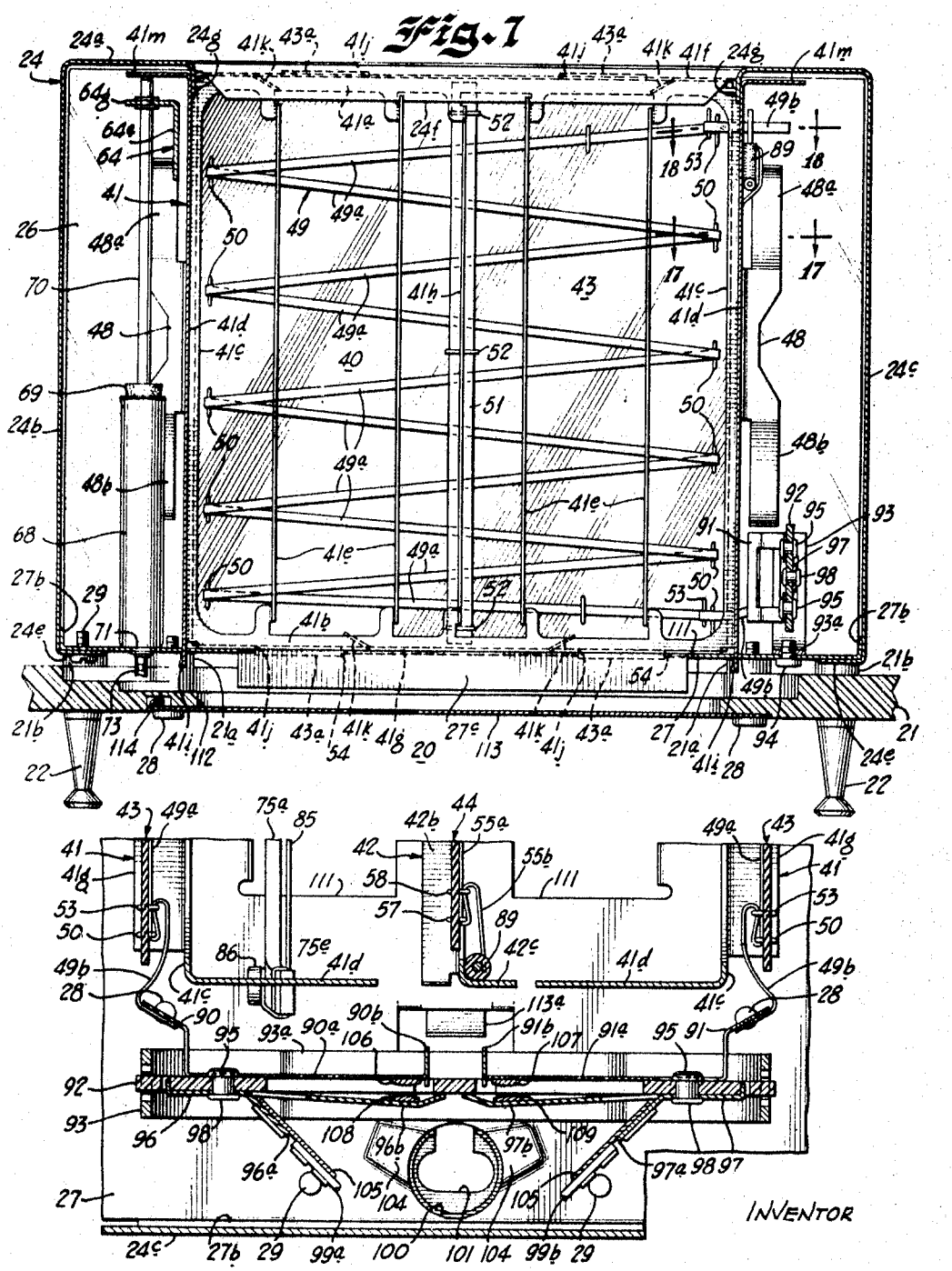

Aug. 12, 1969
J. T. WILLIAMS
3,461,274
ELECTRIC FOOD TOASTER
Original Filed Oct. 22, 1965
6 Sheets-Sheet 6
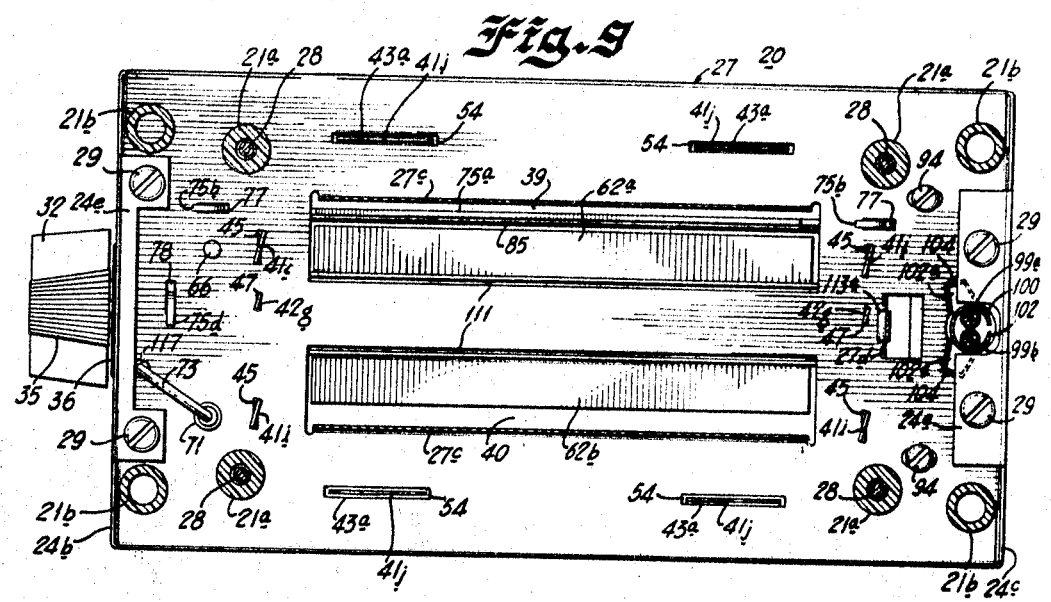
Fig. 9
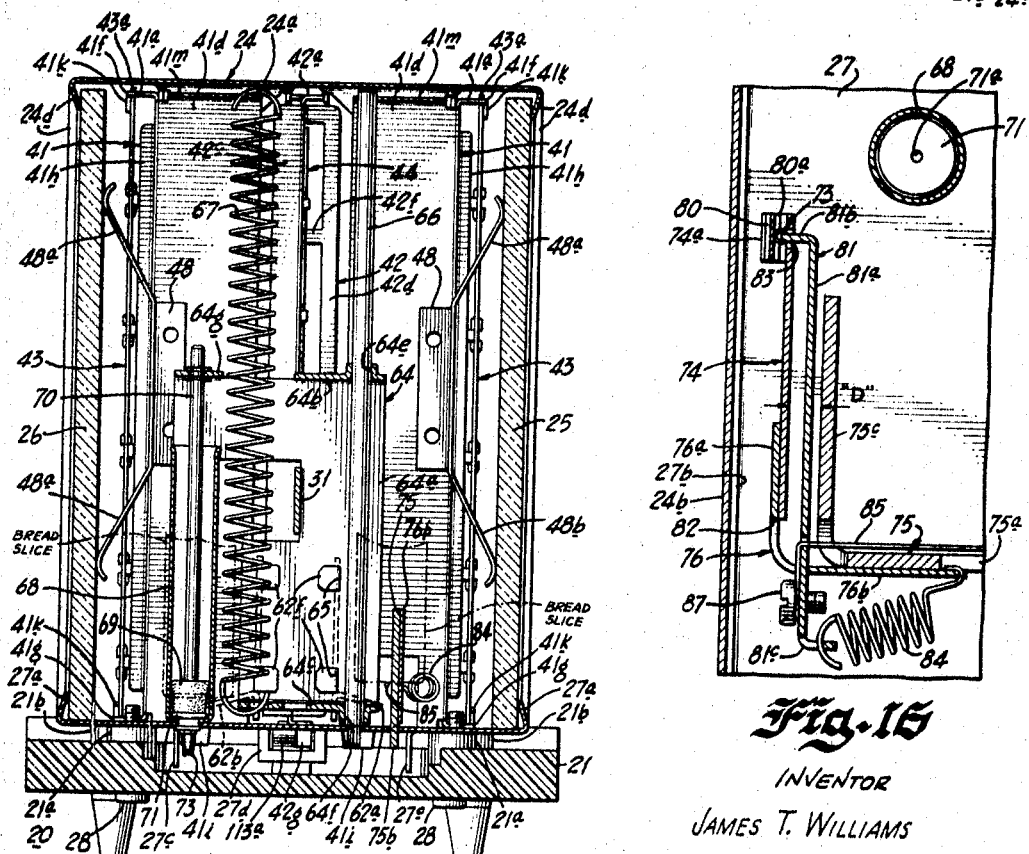
Fig. 10
Fig. 16
INVENTOR
JAMES T. WILLIAMS

United States Patent Office 3,461,274
Patented Aug. 12, 1969

3,461,274
ELECTRIC FOOD TOASTER
James T. Williams, Downers Grove, Ill., assignor to Sunbeam Corporation, Chicago, Ill., a corporation of Illinois
Original application Oct. 22, 1965, Ser. No. 502,645, now Patent No. 3,392,663, dated July 16, 1968. Divided and this application July 12, 1967, Ser. No. 652,777
Int. Cl. H05b 3/26; A47j 37/08
U.S. Cl. 542—219                                7 Claims

ABSTRACT OF THE DISCLOSURE

An electric toaster with a heating element having a resistance wire which zigzags across one face of an insulating form. A staple is positioned at the end of each wire span to hold the wire to the form. Glass side walls of the toaster housing are held in position by spring biasing means.

---

This application is a division of copending application Ser. No. 502,645, filed Oct. 22, 1965, which matured into Patent No. 3,392,663.

The present invention relates to electric toasters and, more particularly, to electric toasters of the automatic or semiautomatic type wherein the time interval during which a bread slice is toasted is selectively and automatically controlled to provide for uniform toasting action of successive bread slices placed in the toaster.

Most automatic toasters of the type described include complicated and costly mechanisms for controlling the toasting action on bread slices placed in the toaster. Generally, these toasters include an arrangement wherein bread slices are inserted into the toaster and are supported on a movable toast carriage disposed between opposed facing heating elements of a toasting chamber. The toast carriage is then either manually or automatically moved to a toasting position wherein the bread is toasted to a selected degree or color and the carriage is then released automatically at the end of a toasting interval to move upwardly in a pop-up action to a position wherein the bread can be removed from the toaster for consumption.

One of the problems associated with previous toasters of the type described is that of obtaining a uniform selected degree of toasting of successive bread slices placed in the toaster, even though ambient temperature conditions in the toaster change from time to time after the toasting of the initial bread slice placed in the toaster. Another problem is to provide heating elements for the toaster which toast the surface of the bread evenly and uniformly without developing hot spots or lines or areas of uneven toasting on the bread surface. Another problem of previous toasters is in providing a latching mechanism for maintaining the toast carriage in a toasting position which is foolproof in operation and easily releasable at the end of a toasting cycle. Another problem is in providing a toaster which is economical to manufacture, compact in size, light in weight, and foolproof and dependable in operation.

Accordingly, it is an object of the present invention to provide a new and improved electric toaster.

Another object of the present invention is the provision of a new and improved electric toaster which eliminates, or greatly reduces, the above-mentioned problems.

More specifically, it is an object of the present invention to provide a new and improved compact, low cost, neat-in-appearance, electric toaster which is easy to assemble and disassemble for servicing, which requires a minimum number of parts, and which lends itself readily toward ease in mass production and uniform quality standards.

A further object of the present invention is to provide a new and improved, highly compact electric toaster having an outer enclosure which is neat in appearance and which can be easily and rapidly disassembled to expose the internal structure of the toaster for servicing.

Still another object of the present invention is to provide a new and improved electric heating element for a toaster which is simple to manufacture, low in cost, and which is not subject to the aforementioned difficulties of providing hot spots or uneven toasting action.

Another object of the present invention is the provision of a new and improved heating element for a toaster wherein the heating wire on expansion does not sag or bulge away from the face of the supporting insulating form.

Yet another object of the present invention is the provision of a new and improved electric toaster having new and improved means for holding the bread carriage in a toasting position and releasing the carriage after a toasting cycle is completed.

A further object of the present invention is the provision of a new and improved automatic means for controlling the toasting action on the bread slices to obtain uniformity even though ambient temperature conditions within the toaster do change between successive toasting cycles.

Still another object of the present invention is the provision of a new and improved electric toaster wherein the automatic means for controlling the toasting interval is directly responsive to the condition of the bread slice being toasted.

Another object of the present invention is to provide a new and improved electric toaster having a new and improved system for controlling the toasting action whereby the toast carriage is easily released from the toasting position at the completion of a selectively adjustable toasting cycle.

Further objects and advantages of the present invention will become apparent as the following description proceeds, and the features of novelty which characterize the invention will be pointed out with particularity in the claims annexed to and forming a part of this specification.

For a better understanding of the present invention, reference should be had to the following detailed description taken in conjunction with the drawings, in which:

FIG. 1 is a perspective view of a new and improved toaster constructed in accordance with the features of the present invention, with the toast carriage in its upper, or normal, nontoasting position;

FIG. 2 is an enlarged, transverse, sectional view taken substantially along the line 2—2 of FIG. 1;

FIG. 3 is a sectional view taken substantially along line 3—3 of FIG. 2, assuming that FIG. 2 shows the entire structure;

FIG. 4 is a sectional view taken substantially along line 4—4 of FIG. 3, assuming that FIG. 3 shows the entire structure;

FIG. 5 is a transverse, sectional view taken substantially along line 5—5 of FIG. 4, assuming that FIG. 4 shows the complete structure;

FIG. 6 is a transverse, sectional view taken substantially along line 6—6 of FIG. 4, again assuming that FIG. 4 shows the complete structure;

FIG. 7 is a sectional view taken substantially along line 7—7 of FIG. 3, assuming, of course, that FIG. 3 shows the entire structure;

3,461,274

FIG. 8 is a fragmentary, sectional view taken substantially along line 8—8 of FIG. 3 and illustrating the thermally responsive control mechanism of the toaster;

FIG. 9 is a sectional view taken substantially along line 9—9 of FIG. 4, again assuming that FIG. 4 shows the complete structure;

FIG. 10 is a transverse, sectional view quite similar to FIG. 2 taken substantially along line 10—10 of FIG. 4, again assuming that FIG. 4 shows the complete structure, but illustrating the toast supporting carriage in its lower or toasting position;

FIG. 11 is an enlarged, fragmentary, sectional view taken substantially along line 11—11 of FIG. 6, assuming that FIG. 6 shows the entire construction;

FIG. 12 is a fragmentary, sectional view taken substantially along line 12—12 of FIG. 4, again assuming that FIG. 4 shows the complete structure, and illustrating in detail the hinge support means of the crumb tray;

FIG. 13 is an enlarged, fragmentary, sectional view taken substantially along line 13—13 of FIG. 2, assuming that FIG. 2 shows the complete structure, and illustrating in detail the color control selecting means of the toaster;

FIG. 14 is an enlarged, fragmentary, sectional view taken substantially along the line 14—14 of FIG. 2, again assuming that FIG. 2 shows the complete structure, and illustrating in detail a portion of the toast carriage latching means of the toaster;

FIG. 15 is an enlarged, fragmentary, sectional view taken substantially along line 15—15 of FIG. 2, again assuming that FIG. 2 shows the complete structure, and illustrating in detail another portion of the toast carriage latching means of the toaster;

FIG. 16 is an enlarged, fragmentary, sectional view taken substantially along line 16—16 of FIG. 2, again assuming that FIG. 2 shows the complete structure, and illustrating in detail another aspect of the toast carriage latching means of the toaster;

FIG. 17 is an enlarged, fragmentary, sectional view taken substantially along line 17—17 of FIG. 7, assuming that FIG. 7 shows the complete structure, and illustrating in detail the construction of a heating element of the toaster;

FIG. 17a is a fragmentary cross-sectional view taken substantially along lines 17a—17a of FIG. 17, assuming that FIG. 17 shows the complete structure; and FIG. 18 in an enlarged, fragmentary, sectional view taken substantially along line 18—18 of FIG. 7, again assuming that FIG. 7 shows the complete structure and illustrating in detail the construction of a terminal end of the heating element of the toaster.

Briefly, the foregoing and other objects and advantages of the present invention are accomplished by providing an electric toaster comprising a frame structure and a toast carriage movable between a pair of opposed, facing, heating elements carried on said frame between a normal or upper nontoasting position and a lower toasting position. Bread slices are placed upon the toast carriage which is then moved downwardly to the toasting position wherein opposite sides of the bread slice are exposed to the heating elements for toasting. Dashpot means interconnecting the movable toast carriage and the frame is mounted at one end of the toast carriage and comprises a cylinder having one closed end and a piston movable therein toward the closed end when the toast carriage is moved to the toasting position. The toast carriage is maintained or latched in the toasting position by the suction action between the piston and the closed end of the cylinder, and the carriage is released for movement back to the upper or normal position by admitting atmospheric air into the lower end of the cylinder through a tube connected thereto.

The tube is normally maintained in a pinched-off or closed condition by a biased pinching member which is connected to a thermally responsive control element positioned to contact the bread slice placed in the toasting position on the carriage. As the bread slice is toasted, the thermally responsive element expands in accordance with the toasting action thereon and, after a selected amount of expansion, the element overcomes the biasing force on the pinching member releasing the pinching contact on the tube and permitting the toast carriage to rise, terminating the toasting cycle.

Another feature of the present invention includes the heating units of the toaster which are constructed in a unique and greatly simplified manner over those of previous toasters. The heating panels each comprise a thin, flat sheet or card of insulating material on which are secured divergent, straight spans of a continuous electric resistive heating wire. Each span is secured on the face of the insulating form in a unique manner, with staples which overlie one span and underlie the next adjacent one, thus permitting the spans to be patterned on the form in a much simpler manner.

Other novel features of the toaster will become apparent from the following, more detailed description, and these include the interrelating functional aspects of the color control system and carriage latching and release mechanism.

Referring now, more specifically, to the drawings, there is illustrated a new and improved electric toaster constructed in accordance with the features of the present invention and referred to generally by the reference numeral 20. The toaster 20 includes an outer enclosure or housing mounted on a base 21 which is preferably formed of heat insulating material, such as a molded phenolic resin. The base 21 is supported on a plurality of short legs 22 extending downwardly therefrom and secured to the base with suitable fasteners, such as downwardly extending screws 23 (FIGS. 2 and 6).

The outer enclosure, or housing, of the toaster is box-like in appearance and comprises an outer shell 24 of inverted U-shaped configuration (FIGS. 1, 4, and 7), a pair of side panels 25 and 26 preferably formed of decorative insulating glass or the like, and a bottom panel 27. The shell 24 is integrally formed from a single piece of material and includes a top panel 24a, a control end panel 24b, and an opposite end panel 24c. The assembled housing, including the shell 24 and bottom panel 27, is secured in position on the support base 21 by a plurality of screws 28 (FIGS. 4, 7, 9 and 10) which extend upwardly through the base and are threaded into the bottom panel 27. The bottom panel rests upon a plurality of upwardly extending, short, tubular, supporting bosses 21a and 21b formed on the upper surface of the base 21 and integral therewith to permit air ventilation between the bottom panel and the base, as shown in FIGS. 2, 5, 6, 7, 9, and 10. The screws 28 extend upwardly through the centers of the tubular bosses 21a.

In order to limit the outward movement of the glass side panels 25 and 26 and to provide a decorative trim or frame along the edges thereof, the bottom panel 27 is formed with a pair of upwardly extending side flanges 27a which bear against the outer faces of the side panels. The top and end panels of the shell 24 are each formed with a pair of inturned side flanges 24d which, together with the flanges 27a, form rectangular peripheral frames around the edges of the respective side panels, as shown in FIG. 1. The shell is secured to the bottom panel 27 by a plurality of screws 29 (FIGS. 2, 7, and 9) extending upwardly through a pair of inturned, horizontally disposed, bottom flanges 24e (FIG. 9) formed at the lower end of the end panels 24b and 24c, respectively, and the bottom panel 27 is provided with upstanding end flanges 27b at opposite ends thereof to bear against the inner surfaces of the respective end panels of the shell when the shell is in assembled position thereon.

From the foregoing, it is apparent that the entire toaster housing and internal structure carried therein, can be easily separated from the base 21 by loosening the screws 28, and, once the housing is removed from the base, it can be easily disassembled by loosening the screws 29 which secure the shell 24 to the bottom panel 27. Once the shell is separated from the bottom panel, the insulating and decorative side panels 25 and 26 can be removed and the internal structure of the toaster is then completely exposed for servicing or replacement of parts.

To permit vertical movement of a carriage described hereinafter, a carriage actuating arm 31 (FIG. 4) extends outside the housing, described above, through a vertically extending slot 30 (FIG. 1) defined in the end panel 24b. The portion of arm 31 which projects outwardly through the control end panel 24b is provided with a removable knob 32 to facilitate grasping by the operator and thus permits the operator manually to move the toast carriage of the toaster. The panel 24b is also formed with an aperture 33 (FIG. 13) to permit the outward projection of a control shaft 34 for the color control mechanism of the toaster described hereinafter, and a removable, fluted, control knob 35 is carried on the outer end of the shaft. The knob 35 is rotatable between selected positions to select the desired toasting action on the bread slices, as will be more fully explained hereinafter, and a suitable escutcheon plate or dial 36 with appropriate markings thereon, such as "Dark" and "Light," is affixed to the end panel 24b around the aperture 33 to aid the operator in making selections with the knob.

In order to permit bread slices to be inserted into the toaster for toasting, the top panel 24a of the shell 24 is formed with a pair of spaced, elongated bread-receiving slots 37 and 38 (FIG. 1) which define the entrance to and overlie a pair of toasting chambers 39 and 40 (FIGS. 1, 5, and 9) within the housing. The longitudinal edges of the slots 37 and 38 are defined by pairs of downwardly depending edge flanges 24f, and the ends of the slots are defined by downwardly depending end flanges 24g (FIGS. 1, 4, 5, and 7). These depending flanges are integrally formed on the shell and aid in interlocking the shell with the toasting chamber structure interiorly of the toaster housing when the shell is in an assembled position on the bottom panel 27.

The toasting chambers 39 and 40 are generally parallel to one another and extend vertically upward between the bottom panel 27 and the top panel 24a in order to accommodate a pair of vertically upstanding bread slices which are placed therein for toasting. Outer sidewalls of the toasting chambers are formed by a pair of substantially identical, upstanding, heating, panel supporting frame structures 41, and the inner sidewalls of the toasting chambers are formed by the opposite faces of a common, centrally disposed, upstanding, heating, panel support frame structure 42 (FIGS. 3, 5, and 11). Each outer frame 41 is integrally formed from a single piece of sheet metal by a stamping operation and carries a heating panel 43 for toasting one side of an adjacent bread slice placed in the toaster. The central frame 42 is also integrally formed from a single piece of sheet metal by a stamping operation and supports a single central heating panel 44 having resistive heating wire on both sides thereof for toasting both inside faces of the bread slices placed in the toasting chambers 39 and 40.

The stamped metal frames 41 and 42 each includes a continuous periphery and a plurality of cross members, all integrally formed from a piece of flat sheet metal. The frames 41 are formed with horizontally disposed top and bottom members 41a and 41b, respectively, joined at their ends to a pair of vertically upstanding side members 41c having wide, inwardly extending flanges 41d which comprise the end walls of the respective toasting chambers 39 and 40 (FIGS. 3, 5, 7, and 11). Intermediate, and parallel to, the side members 41c are formed a plurality of spaced-apart, bread guiding ribs 41e (FIGS. 3, 4, 5, and 7) integrally joined at their upper and lower ends to the top and bottom members 41a and 41b. The top and bottom members are L-shaped in cross section and include outwardly extending horizontally disposed flanges 41f and 41g, respectively, for spacing the heating panels with respect to the inner edges of the bread guiding ribs 41e. The ribs 41e are narrow, relatively thin, flat strips with the planes of the strips arranged to lie perpendicularly to the faces of the adjacent bread slices, as best shown in FIG. 3 of the drawings. Each frame 41 also includes a centrally disposed spacer rib 41h (FIGS. 3 and 5) parallel to the ribs 41e, and positioned with its outer edge facing the inner surface of the heating panel 43 to prevent the panel from bowing or moving inwardly to any great extent toward the bread slice in the adjacent toasting chamber.

The flanges 41g of the frames 41 are supported on the bottom panel 27 of the toaster, and the frames are secured thereto by downwardly projecting bend tabs 41i formed at the lower ends of the side member flanges 41d to extend through narrow slits 45 in the bottom panel 27, as best shown in FIG. 9. The upper portions of the frames 41 are interlocked with the shell 24 when it is in an assembled position by the engagement between the downturned flanges 24f and small notches 46 formed in the bread guiding ribs 41e, as best shown in FIG. 5, and this engagement prevents lateral movement of the upper portion of the frames, once the shell is in place. The flanges 24g of the shell abut the side member flanges 41d of the frames, as best shown in FIG. 4, to prevent longitudinal movement between shell and frames.

The single central heating panel frame 42 includes horizontally disposed top and bottom members 42a and 42b, respectively, joined at their ends by a pair of vertically upstanding side members 42c. Intermediate and parallel to the side members 42c are formed two groups of spaced-apart, bread guiding ribs 42d and 42e (FIGS. 3 and 5). The outer edges of the ribs 42d are disposed to face the toasting chamber 39, and the outer edges of the ribs 42e face in an opposite direction toward the toasting chamber 40, as best shown in FIG. 5. The ribs are narrow, relatively thin, flat strips arranged with the plane of the strips lying perpendicular to the faces of the bread slices in the toasting chambers and are formed with a plurality of spacing lugs 42f extending inwardly thereof to bear against the opposite faces of the centrally disposed heating panel 44, as shown best in FIG. 5.

The bottom member 42b of the central frame rests upon the bottom panel 27 and is formed with a pair of downwardly extending bend tabs 42g at opposite ends thereof, which extend through suitable slots 47 in the bottom panel to secure the frame in place, as best shown in FIG. 9. The upper portion of the central frame 42 is maintained in proper spaced relation between the outer frames 41 and is prevented from lateral movement by interlocking engagement between the downturned flanges 24f of the shell and the top member 42a of the frame, as best shown in FIG. 5.

After the shell 24 is assembled to the bottom panel 27, the frames 41 and 42 are interlocked with the shell, as described, to prevent lateral movements of the frames within the housing. The glass side panels 25 and 26 are maintained in upright vertical positions and are biased outwardly against the flanges 24d and 27a of the shell and bottom panel by means of spring clips 48 attached to the side member flanges 41d of the frames 41, as best shown in FIG. 6. Preferably, the clip members are riveted to the flanges 41d, and each includes a pair of outwardly extending spring fingers 48a and 48b which bear resiliently against the inside surface glass side panels.

The heating panels 43 comprise a thin, flat sheet or cardlike form constructed of heat resistant, insulating material, such as mica or the like, and on which is secured a continuous length of flat, ribbonlike, electric resistance heating wire 49. The heating wire is laid in a zigzag pattern across the face of the panel, forming a plurality of straight, divergent spans 49a extending in generally horizontal directions back and forth from one side of the panel to the other, as best shown in FIG. 7. The end of one span is continuous with the end of the next adjacent span, and the spans are formed by looping the wire around the central or bight portions 50a of small wire staples 50 (FIGS. 7 and 17) which secure the wire spans to the heating faces of the panels. The bight portions 50a of the staples are spaced outwardly of the outer faces of the panels 43 (as clearly shown in FIG. 17a) to permit the spans 49a to expand longitudinally on the panel during heating and contract after heating, as indicated by the arrows (FIGS. 17 and 18). The staples 50 are spaced vertically apart and are arranged in two vertical rows along the opposite sides of the panel with the bight portions of the staples extending generally transversely of the spans and the staple legs extending through the panels and clinched or bent over on the other side. Only a single staple is required to secure the ends of two adjacent spans 49a with the bight portion of the staple overlying one of the spans and underlying the other span. Accordingly, as the spans lengthen slightly during a heating period, they do not tend to bulge away from the cards to any great extent and, consequently, fewer hot spots develop which would cause uneven heating or burning of the toast slices. The mica panels 43 are made up of at least two layers of mica paper (FIG. 17), and the layer adjacent the heating wire expands as the wire is heated while the layer on the back side is relatively unaffected thereby, causing a bowing action in the panel. The bowing action of the panel aids in preventing the wire spans from bulging or sagging away from the face of the panel during heating and helps to eliminate hot spots and uneven toasting action.

One of the important advantages of the heating panel construction of the present invention is that by using staples 50 to secure the ends of adjacent spans of heating wire 49a to the panel it is possible to adjust the length of the spans to provide the selected wattage or heating desired. Heating ribbon wire is obtained from manufacturers in large lots and the characteristics of the wire may vary from lot to lot. Accordingly, the spans 49a can be shortened or lengthened as desired by proper spacing of the staples 50 on the panel. For example, if a lot of heating wire having a relatively high resistivity per unit length is obtained, the spans 49a are shortened in length and this is readily accomplished by moving the staples 50 inwardly from the edges of the panels to conform. Conversely, if the spans 49a are longer, the staples 50 are moved outwardly toward the edges of the panel to take up the additional length of the spans. This greatly simplifies the construction of the heating elements and facilitates uniformity in heating characteristics, even though the heating wire characteristics may vary slightly from lot to lot.

In order to support the central portions of the heating wire spans 49a and prevent any appreciable sagging or bulging thereof away from the panel face, a vertical, centrally disposed strip 51 (FIG. 7) of mica insulating material is stapled to the panel 43 with staples 52 to overlie the spans and hold them in position. The upper and lower heating wire spans 49a are joined with terminal tabs 49b which extend outwardly from the right-hand edge of the panel 43, as best shown in FIG. 7. The terminal tabs are continuous with the heating wire 49 and are looped, as shown in FIGS. 11 and 18, with the inner end of the loops loosely held in place on the panel by staples 53 located inwardly of the end staples 50. This construction greatly simplifies the termination of the heating elements because an extended length or tab of the heating wire itself forms the terminal element, and only an extra staple 53 is required to complete the termination. Previous terminal constructions utilized eyelets, solder joints, separate terminal lugs, etc., and, accordingly, are much more complicated and expensive. The staples 53 loosely hold the spans 49a and terminal tabs 49b and do not interfere with the longitudinal expansion thereof during heating.

From the foregoing, it is apparent that the heating wire 49 can be easily and rapidly secured to the panels 43 with the staples 50, 52, and 53 and strips 51, and construction of the heating elements is appreciably simplified over previous constructions. Sagging or bulging of the wire spans 49a is greatly reduced or eliminated, and hot spots and uneven toasting of the bread slices are reduced thereby.

The panels 43 are secured to the metal frames 41 by a plurality of upper and lower tabs 43a (FIGS. 7 and 9) formed to extend slightly above and below the upper and lower edges, respectively, of the panels, and these tabs are seated in recesses 41j (FIGS. 3 and 7) formed in the horizontally disposed flanges of the upper and lower frame members 41a and 41b. The lower tabs 43a extend downwardly, slightly below the lower frame members 41b and are accommodated in elongated slots 54 formed in the bottom panel 27 (FIG. 9). After the tabs 43a are seated within the recesses 41j of the frame, short bend tabs 41k are displaced (as best shown in FIG. 7) to hold the cards securely in place on their respective frames.

Because both side faces of the central heating panel 44 are heated, the toaster can be more compact in width than if two panels were used and, accordingly, the single, central panel is constructed somewhat differently than the outer panels 43. Preferably, the panel 44 is formed of a single layer comprising a thin, flat sheet of mica insulating material and a continuous length of heating wire 55 is strung across opposite faces of the panel, as best shown in FIG. 4. The panel 44 is formed with spaced-apart notches 56 along opposite side edges thereof (FIG. 4), and the heating wire 55 is strung across one face and then the opposite face to form spans 55a on both faces of the panel. Each panel face thus carries a plurality of vertically spaced spans 55a for heating and toasting the surface of an adjacent bread slice. The notches 56 provide the proper vertical spacing between the spans 55a, and terminal tabs 55b are formed to extend outwardly from the right-hand edge of the panel 44 from the upper and lowermost spans in a manner similar to those of the panels 43. The terminal tabs 55b are looped, as shown in FIG. 11, and are held in place by a pair of staples 57 and 58. Additional staples 59 are spaced inwardly of the terminal tabs on the upper and lowermost spans 55a and a pair of centrally located vertical mica strips 60 are stapled on both faces of the panel 44 with staples 61 to support the central portions of spans 55a and prevent bulging or sagging of the spans away from the faces of the panel. The notches 56 permit the spans 55a to expand longitudinally outward toward opposite edges of the panel 44 without interference and, hence, bulging or sagging of the spans during heating is reduced. The panel 44 is held in a sandwiched position between the bread guiding ribs 42d and 42e on the central frame 42 by the inwardly extending lugs 42f, and the lower edge of the panel rests upon outwardly projecting lower portions 42h of the ribs, as best shown in FIG. 5.

In order to support bread slices placed in the toasting chambers 39 and 40 for toasting, the toaster includes a bread carriage 62 which is movable vertically between an upper or normal position (FIGS. 2 and 4) and a lower or toasting position (FIG. 10). The bread carriage includes a pair of somewhat horizontally disposed bread supporting members 62a and 62b (FIGS. 3, 4, 5 and 9) which extend into the respective toasting chamber 39 and 40 to support the lower edges of the bread slices placed therein.

As viewed in FIG. 5, each of the bread supporting members 62a and 62b includes an upper flange on which a portion of the lower edge of a bread slice rests and a vertically disposed flange portion for stiffening the member. The vertical flanges of the bread supporting members 62a and 62b are generally U-shaped in side elevation (FIG. 4), and each includes a pair of upwardly extending end portions 62c and 62d disposed to extend outwardly from the opposite ends of the toasting chambers. The end portions 62c are positioned for vertical sliding movement between the edges of the heating panel frame end flanges 41d adjacent the panel 24c of the toaster and are joined together externally of the flanges by a vertically extending channel segment 63 (FIG. 4) having a web 63a and a pair of horizontal flanges 63b. These end portions 62c are provided with bend tabs 62e (FIGS. 3, 4, and 6) which extend through slots (not shown) in the web 63a of the channel section 63, and the tabs are flattened over against the web (FIG. 6) to hold the channel section in place.

The end portions 62d of the bread carriage are positioned for vertical sliding movement between the edges of the end flanges 41d adjacent the control end panel 24b of the toaster and are joined together externally of these flanges by an enlarged end support member 64 (FIGS. 2, 3, 4, and 10). The member 64 is generally channel-shaped and includes a large central web 64a and a pair of horizontal upper and lower flanges 64b and 64c which extend outwardly toward the control end panel 24b of the toaster. The upright end portions 62d of the carriage include small bend tabs 62f (FIG. 2) which extend through slots 65 provided in the web 64a, and the tabs are flattened against the web to secure the support member to the U-shaped bread supporting members 62a and 62b of the carriage.

In order to mount the bread carriage for vertical movement in the toaster, a vertical support post 66 is mounted adjacent the control end of the toaster to extend between the bottom wall 27 and one of several horizontal flanges 41m which are formed at the upper ends of end flanges 41d. The support post 66 extends through circular flanged openings 64e and 64f (FIG. 2) formed in the upper and lower flanges 64b and 64c of the support member, and provides guiding support for the bread carriage as it is moved between upper and lower positions. Preferably, the carriage actuating arm 31 (previously described) is an integrally formed portion of the support member 64 extending outwardly from the web 64a and, accordingly, provides a convenient means for manual control of the bread carriage in the toaster.

In order to bias and maintain the bread carriage 62 in the normal or nontoasting position (FIGS. 2 and 4), a carriage spring 67 is connected between one of the flanges 41m and the lower end flange 64c of the carriage support member 64. When the carriage is moved downward to the toasting position (FIG. 10), the spring 67 is elongated, and when the carriage is released, the spring automatically returns the carriage to the normal position.

For the purpose of dampening the vertical movements of the bread carriage 62 and holding the carriage in the lower toasting position, an upstanding dashpot assembly is interconnected between the movable bread carriage and the bottom wall 27 of the toaster housing. The dashpot assembly includes a vertically mounted cylinder or tube 68 having an open upper end and a closed lower end secured to the bottom panel 27 (FIG. 13) and a piston 69 is disposed for movement in the cylinder. The cylinder 68 is provided with an opening or port 68a in the side, spaced upwardly a short distance from the lower end thereof. The piston is formed of rubber or other elastomeric material and is carried on the lower end of a depending piston rod 70, the upper end of which is secured to a small horizontal flange segment 64g (FIGS. 2 and 7) formed on the support member 64 of the bread carriage.

The piston 69 is somewhat cup-shaped (FIG. 15) and has an outwardly tapered conical sidewall and an annular lip formed at the upper end thereof. When the piston moves downwardly in the cylinder 68, air within the cylinder is compressed and expelled through the port 68a and past the upper lip of the piston. Further movement of the piston below the port is at a retarded rate because all of the air must escape past the upper lip of the piston. When the piston moves upwardly in the cylinder, a vacuum is drawn in the lower end of the cylinder and the upper lip of the piston is sealed against the internal wall of the cylinder by the air pressure above the piston. This feature permits the dashpot assembly to serve as a holding or latching means for positively maintaining the bread carriage in the lower or toasting position after it has been moved into this position. As the carriage 62 is moved to the toasting position by a downward movement of the knob 32 on the actuating arm 31, the piston 69 moves downwardly toward the bottom of the cylinder 68, and as this occurs, the air within the lower or closed end of the cylinder escapes past the lip of the piston and through the port 68a to the atmosphere. After reaching the downward position, the atmospheric air pressure above the piston seals the lip against the cylinder wall and the carriage is maintained in the lower toasting position by the vacuum in the lower end of the cylinder, even after the operator removes his hand and exerts no downward force from the knob 32. The atmospheric air pressure on the upper surface of the piston exerts enough downward force to overcome the upward force of the carriage spring 67, and the carriage is thus maintained in the toasting position until air is admitted into the closed end of the cylinder.

When air is admitted to the lower end of the cylinder, the pressure begins to equalize on both sides of the piston 69 and the bias spring 67 is effective to move the carriage upwardly to the upper position wherein the toasted bread slices on the carriage can be readily removed from the toaster by the operator. As the piston moves upwardly past the port 68a, air can more freely enter the cylinder below the piston and the piston begins to move upwardly at a faster rate.

For the purpose of controlling airflow into the closed end of the cylinder 68 and thus controlling the release of the carriage for upward movement at the end of a toasting cycle, the cylinder 68 is provided at its closed end with an inlet fitting 71 which serves as a mounting means for securing the cylinder to the bottom panel 27 (FIG. 15). The fitting 71 extends downwardly through an opening 72 in the bottom panel 27 and is provided with a small diameter central passage 116 which is connected to one end of a flexible tube or conduit 73. The other end of the tube 73 is open and the body of the tube is looped under the bottom panel 27 (FIGS. 4 and 12) and extends upwardly through an aperture 117 (FIG. 14) therein to rest against the outer surface of a movable end plate 74 (FIG. 14) which forms a part of the thermostatic control unit of the toaster.

The end plate 74 is connected to an L-shaped, thermostate support bracket 75 (FIGS 3, 8, and 16) by means of an L-shaped, resilient spring member 76 having one leg 76a joined to the end plate and the other leg 76b joined to a long leg 75a of the support bracket. The spring member 76 biases the end plate 74 outwardly toward the control end panel 24b of the toaster, and the position of the end plate relative to the panel is controlled by the color selector knob 35. The long leg 75a of support bracket 75 is mounted to extend along the bottom of the toasting chamber 39 and is secured to the bottom panel 27 of the toaster by a pair of lugs 75b at the ends thereof (FIG. 8) which extend downwardly through slotted openings 77 provided in the bottom panel (FIG. 9). The bracket 75 also includes a short leg 75c facing and spaced inwardly of the end plate 74, and the short leg is secured to the bottom panel 27 by a lug 75d (FIG. 2) which extends downwardly through a slotted opening 78 in the bottom panel (FIG. 9).

In order to move the end plate 74 toward and away from the control end panel 24b, the color control selector shaft 34 is threadedly engaged with the fixed short leg 75c of the thermostat support bracket, and rotation of the shaft knob 35 moves the shaft axially with respect to the end plate 74. The shaft is formed with an enlarged shouldered portion 34a having an inner annular face 34b which bears against the outer surface of the movable end plate 74 and, by rotating the knob 35, the spacing D (FIG. 13) between the end plate 74 and the fixed leg 75c can be selected as desired.

The open end of the tube 73 is loosely secured to the movable end plate 74 by means of a small lip 74a (FIG. 14) having an opening 79 therein through which the tube extends. The tube is normally maintained in a closed or pinched-off condition by a spring clamping member 80 having its upper end secured to the end plate 74 and an inturned lower lip 80a which bears against the tube adjacent the open end thereof. Normally, air cannot enter the closed end of the dashpot cylinder 68 to release the carriage until the flexible tube 73 is allowed to open by movement of the lip 80a outwardly away from the tube toward the control end panel 24b.

For the purpose of opening the tube 73 at the completion of a selected toasting cycle, an operator 81 is mounted adjacent the short leg 75c of the support bracket 75 for pivotal movement about a vertical axis. The operator extends through a slotted opening 82 formed in the spring member 76 adjacent the junction of legs 76a and 76b thereof and bears against the right-hand edge of the opening, as viewed in FIG. 16. The operator comprises an elongated leg 81a extending between the movable end plate 74 and the short leg 75c and has a lug 81b at the outer end thereof for engaging the clamping member 80 to open the tube 73. The lug 81b has a rounded outer end (FIGS. 13 and 14) and extends through an opening 83 in the movable end plate 74 for contact with the clamping member 80. The opposite end of the operator 81 is provided with a small lug 81c (FIG. 16) which is connected to one end of a balance spring 84 having an opposite end secured to the leg 76b of the L-shaped spring member 76. The spring 84 biases the operator 81 in a counterclockwise direction (FIG. 16) so that the lug 81b will move outwardly into engagement with the clamping member 80 to release the pinching action on the tube 73.

In order to control the movements of the operator 81 in response to the toasting action on a bread slice placed in the toaster, an expendable wire thermostatic element 85 is mounted to extend across the bottom of the toasting chamber 39. One end of the thermostat wire 85 is secured to an upstanding lug 75e on the far end of the long leg 75a of the thermostat support bracket 75 by means of screw 86 (FIG. 8) and the other end of the wire is secured to the operator 81 by a screw 87 (FIG. 16). When the toast carriage 62 is moved to its lower toasting position, the lower edge of a bread slice in the chamber 39 rests directly on the thermostat wire 85 (FIG. 10) and, hence, the wire element is directly in contact with and responsive to the temperature of the bread slice. As the bread slice is toasted, the temperature of the wire will increase and the wire will expand or lengthen by an amount generally proportional to the toasting action. The wire 85 exerts a force on the operator 81 generally opposite to that of the balance spring 84 and biases the operator in a clockwise direction (FIG. 16). As the wire 85 expands in length during a toasting cycle, this force is relaxed in proportion to the temperature of the bread slice being toasted, and the balance spring will gradually move the operator in a counterclockwise direction until the lug 81b contacts the clamping member 80 and moves it outwardly away from the tube 73, permitting air to enter the cylinder 68 and release the toast carriage to move upwardly and terminate the toasting cycle.

Because the thermostat wire 85 is in direct contact with the bread slice being toasted in chamber 39, its length is a true indication of the temperature or toasting action on the slice, and, by rotation of the color control knob 35 to move the end plate to selected position, the desired amount of toasting action can be selectively controlled. When the knob 35 is rotated in a counterclockwise direction, the end plate 74, under the influence of the L-shaped spring member 76, moves outwardly toward the control end panel 24b of the toaster and accordingly more movement of the lug 81b of the operator is necessary to open the tube 73 and terminate the toasting cycle. Hence, a longer toasting cycle is required to expand the thermostat wire 85 enough to permit the operator 81 to open the tube. When the knob 35 is rotated in a clockwise direction, a shorter toasting cycle is selected because less expansion of the thermostat wire 85 is required to open the tube 52 and release the carriage. After the toasting cycle is completed, the thermostat wire contracts in length and moves the operator 81 in a clockwise direction against the spring 84 permitting the clamping member 80 to again pinch off or close the tube 73 in preparation for the next toasting cycle. The selector shaft 34 moves the end plate 74 inwardly or outwardly with respect to the operator 81 and thereby controls the amount of movement required by the operator before the lug 81b contacts the clamping member 80 to open the tube 73. The lengthening of the wire 85 in response to the temperature or color of a bread slice during heating in a toasting cycle permits the operator 81 to move outwardly toward the end plate 74. Accordingly, if a larger spacing is selected between the end plate and operator, more heating, or a long toasting cycle, is necessary and, hence, the bread is toasted to a greater degree or darker color.

When the tube 73 is opened by the action of the thermostat wire 85, air enters the lower end of the cylinder 68 and the piston 69 and toast carriage 62 begin to move upwardly at a relatively slow rate because of the small diameter and length of the tube 73. When the piston 69 has traveled upwardly for a short distance (approximately ½″) it passes above the port 68a in the cylinder wall and air is freely admitted beneath the piston. When this occurs, there is little restriction against the upward movement of the piston and bread carriage, and they then move more rapidly upward under the influence of the carriage spring 67. If it is desired to manually release the carriage from its lower toasting position, the knob 32 need only be moved upwardly until the piston 69 is above the cylinder port 68a and then the carriage 62 will continue upwardly without further force being required.

When the carriage 62 is moved downwardly from the upper position to initiate a toasting cycle, air beneath the piston 69 is forced out the port 68a in addition to bypassing the piston upwardly. However, as the piston passes below the port, downward movement is slowed because the only escape for the air below the piston is upwardly around the upper lip thereof.

The heating elements of the toaster include the wire spans 55a on both sides of the central panel 44 and the wire spans 49a on the outer panels 43. These heating elements are energized at the beginning of a toasting cycle and deenergized at the termination of the cycle in response to the movement of the carriage 62 between its normal position and its lower toasting position. Preferably, the heating elements of the toaster are wired in series with the heating wire 55 on the central heating panel 44 joined between the heating wires 49 on the outer panels 43 by a pair of jumper wires 88 and 89 (FIG. 6) having heat-resistant insulation thereon.

The lower corner terminals 49b of the two outer heating elements are connected to a pair of terminal contact members 90 and 91 (FIGS. 4, 7, and 11) which are mounted on an upstanding insulating terminal board 92 (FIG. 6). The terminal board 92 is mounted on a U-shaped bracket 93 having a bottom web 93a secured to the bottom panel 27 of the toaster by upwardly extending screws 94.

Each of the terminal members 90 and 91 is secured to the inside face of the terminal board by a pair of spaced rivets or eyelets 95, and a pair of opposing terminal members 96 and 97 are riveted to the outside face of the terminal board by single rivets 98 spaced in line with and between each pair of rivets 95 (FIG. 6). Electrical power is supplied to the terminals 96 and 97 through an electrical power cord 99 having a pair of conductors 99a and 99b therein. The power cord extends upwardly into the toaster through an opening 100 (FIG. 11) formed in the bottom panel 27, and an aligned opening 101 formed in the support base 21 (FIGS. 4 and 6). A metal bushing 102 is secured between the bottom panel 27 and the support base 21 to prevent fraying of the power cord, and short lengths of insulating tubing 103 are provided on the individual conductors 99a and 99b to prevent possible short circuits to the adjacent metal portions of the toaster. The bushing 102 includes a pair of wing projections 102a at the upper end which seat in recesses 104 formed in the bottom panel 27 adjacent the cord opening 100 to prevent the bushing from rotating.

Each of the conductors 99a and 99b in the power cord 99 is provided with a female end connector 105 which is adapted to be connected with one of a pair of male prongs 96a and 97a formed on the outer terminals 96 and 97, respectively. In order to disconnect the power cord 99 from the terminals 96 and 97, it is only necessary to slide the female end connectors 105 off of their respective male prongs, and once this has been accomplished, the housing of the toaster can be separated from the support base as previously described.

The terminal members 90 and 91 are substantially identical and include elongated contact arms 90a and 91a formed of spring material having contact buttons 106 and 107 adjacent the outer ends thereof, respectively. The contact arms are formed with inwardly extending actuating lugs 90b and 91b at the outer ends thereof, and the lugs have rounded inner ends facing the central portion of the toaster (FIG. 4). When an outward force is applied to the lugs 90b and 91b by downward movement of the carriage 62, the contact arms are deflected outwardly so that the buttons 106 and 107 thereon make connection with contact buttons 108 and 109 mounted at the outer ends of elongated contact arms 96b and 97b of the outer terminal members 96 and 97, respectively. The pair of buttons 106 and 108 form one switch for connecting the conductor 99a of the power cord to one end of series connected heating elements of the toaster, while the pair of buttons 107 and 109 form another switch for connecting the power conductor 99b to the other end of the series connected heating elements. Each pair of contact buttons is normally in a spaced-apart or open position, as shown in FIG. 11, and the contact arms 90a, 91a, 96b, and 97b maintain the contact buttons in open condition until the arms 90a and 91a are deflected outwardly as described.

In order to close both pairs of contact buttons for energizing the heating elements of the toaster, a switch actuator 110, comprising a flat sheet of insulating material is mounted to extend between the flanges 63b of the channel segment 63 at one end of the bread carriage 62. When the bread carriage is in the upper or normal position, the channel segment 63 is well above the actuating lugs 90b and 91b of the terminal members 90 and 91, and each pair of contact buttons is in an open position (FIG. 11). When the carriage is then moved downwardly to the toasting position, the switch actuator 110 moves into contact with the lugs 90b and 91b, biasing the contact buttons 106 and 107 outwardly into contact with the contact buttons 108 and 109, respectively, and thereby closes the circuit to energize the heating elements. The heating elements remain energized as long as the bread carriage 62 is in the lower or toasting position, and at the end of the toasting cycle, when the carriage is released to move upwardly, the actuator 110 moves upwardly out of engagement with the lugs 90b and 91b, and contact between each pair of contact buttons is broken as the springlike contact arms 90a and 91a move the buttons 106 and 107 back to the normally open position.

In order to permit crumbs and toast particles to be removed from the toasting chamber 39 and 40, the bottom panel 27 is formed with a pair of elongated slots 111 (FIG. 9) arranged to underlie the respective toasting chambers. Downwardly depending stiffening flanges 27c are formed along the outside edges of the slots to direct and guide the falling bread crumbs into an enlarged opening 112 (FIGS. 5, 7, and 8) formed in the support base 21 beneath both of the toasting chambers. In order to collect these crumbs, a crumb tray 113 is secured to the support base beneath the opening 112 for pivotal movement about a hinge pin 114 (FIG. 12), the outer ends of which are secured to the base by the screws 28. The crumb tray includes an elongated ventilation slot 115 (FIG. 12) extending along the central axis thereof, and an upwardly extending spring latch member 113a is formed at one end of the tray for engagement with a slotted latching flange 27d integrally formed to extend downwardly from the bottom panel (FIGS. 4 and 5). A downward pull on the latched end of the crumb tray disengages the latch member 113a from the slotted flange 27d, permitting the tray to pivot downwardly for removal of crumbs, and after the crumbs are removed the tray is pivoted upwardly until the upper end of the latch member is latched within the slotted flange 27d, as shown in FIG. 4.

From the foregoing detailed description, the construction and operation of the toaster of the present invention will be readily understood. The toaster is neat in appearance, compact, and light in weight and has a completely new and unique means for selectively controlling the toasting cycle to provide uniformly controlled toasting action of the bread slices. The dashpot assembly of the present invention, in addition to its function in dampening toast carriage movements, serves as latching means for holding the carriage in the toasting position and thereby eliminates costly and complicated latching mechanisms commonly found on other toasters. The control means is directly responsive to the toasting action on the bread slice and the carriage latching and release means is simple and foolproof in operation.

While there has been illustrated and described in a single embodiment of the present invention, it will be apparent to those skilled in the art that numerous changes and modifications will occur, and it is contemplated by the appended claims to cover all such changes and modifications as fall within the true spirit and scope of the present invention.

What is claimed as new and desired to be secured by Letters Patent of the United States is:

1. An electric heating element for a toaster comprising a flat electrical insulating form having opposite faces, an electric resistance wire comprising a plurality of straight spans extending across one of said faces, each of said spans continuously connected at one end to an adjacent span and a staple extending transversely across each span at one end thereof and extending through said form for securing said spans to said one face of said form, each staple includes a bight portion overlying one span at the end thereof and underlying the end portion of an adjacent interconnected span.

2. The heating element of claim 1 wherein said electric insulating form comprises a panel formed of at least two layers of material with said wire being contiguous to one of said layers whereby the heating of said wire causes a bowing action in said panel for preventing said wire spans from sagging away from said one layer.

3. The heating element of claim 1 additionally including an insulating strip attached to said form by staples wherein said strip is centrally disposed across each of said spans for securing the central portions thereof to said form.

4. The heating element of claim 1 wherein said wire has an end span terminating adjacent an edge of said panel, first staple means securing said end span to said panel, terminal means comprising a continuing length of said wire connected to said end span and looped over said staple means, second staple means spaced inwardly on said panel from said first staple means and loosely securing said terminal means to said panel, said terminal means including a portion looped around said second staple means and extending outwardly of said panel for connection to a source of electrical power.

5. The construction of claim 4 wherein said first and second staple means loosely secure said wire to said panel permitting longitudinal expansion of said wire upon heating.

6. In a toaster comprising an outer enclosure having front, top, rear and bottom panel means, said panel means forming an inturned flange means on both sides of said enclosure, a glass panel disposed within said enclosure at each side thereof and in engagement with said flange means, mechanism means in said enclosure including a toasting chamber having electric radiant heating means positioned on each side thereof, said top panel means being provided with slot means disposed above said toasting chamber whereby a slice of bread can be placed in the toasting chamber by inserting it into the slot means, said mechanism means including spring means having resilient arms with curved portions, said curved portions engaging said glass panels and biasing them against said flange means.

7. In the toaster of claim 6 wherein said flange means defining a side opening, said glass panel having a periphery larger than said side opening so that the periphery of said glass panel is not outwardly visible.

References Cited

UNITED STATES PATENTS

| | | | |
|---|---|---|---|
| 1,512,366 | 10/1924 | Russell | 338—306 |
| 2,523,353 | 9/1950 | Boester | 338—280 X |
| 2,570,376 | 10/1951 | Quist | 219—529 |
| 2,659,800 | 11/1953 | Zander | 338—280 |
| 2,782,289 | 2/1957 | Nathason | 219—217 X |
| 1,524,193 | 1/1925 | Mann | 99—341 X |
| 1,839,539 | 1/1932 | Fageros | 99—327 |
| 2,462,607 | 2/1949 | Browne | 219—521 |
| 2,659,799 | 11/1953 | Ireland | 219—542 X |
| 2,747,072 | 5/1956 | Lawser | 219—521 |
| 2,940,481 | 6/1960 | Hunter | 140—93 |
| 3,361,053 | 1/1968 | Jepson et al. | 99—329 |
| 3,392,663 | 7/1968 | Williams | 99—329 |

OTHER REFERENCES

G.E. Robert Smith et al., Electronic Design, "Making the Most of Flat Cables," Oct. 14, 1959, pp. 56–59, 174–68.5.

VOLODYMYR Y. MAYEWSKI, Primary Examiner

U.S. Cl. X.R.

99—385; 338—280, 306, 383; 219—521, 546; 339—105